UNITED STATES PATENT OFFICE.

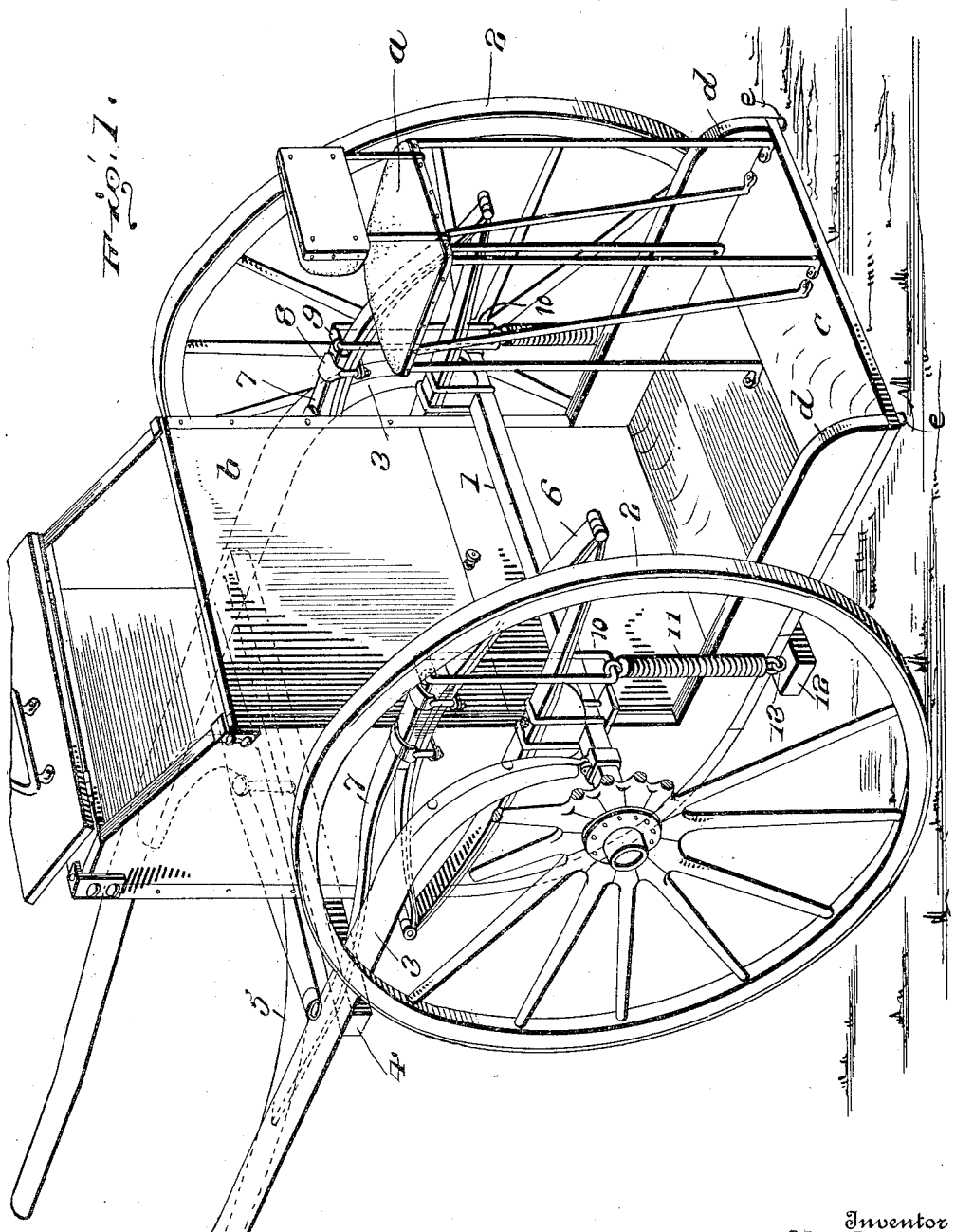

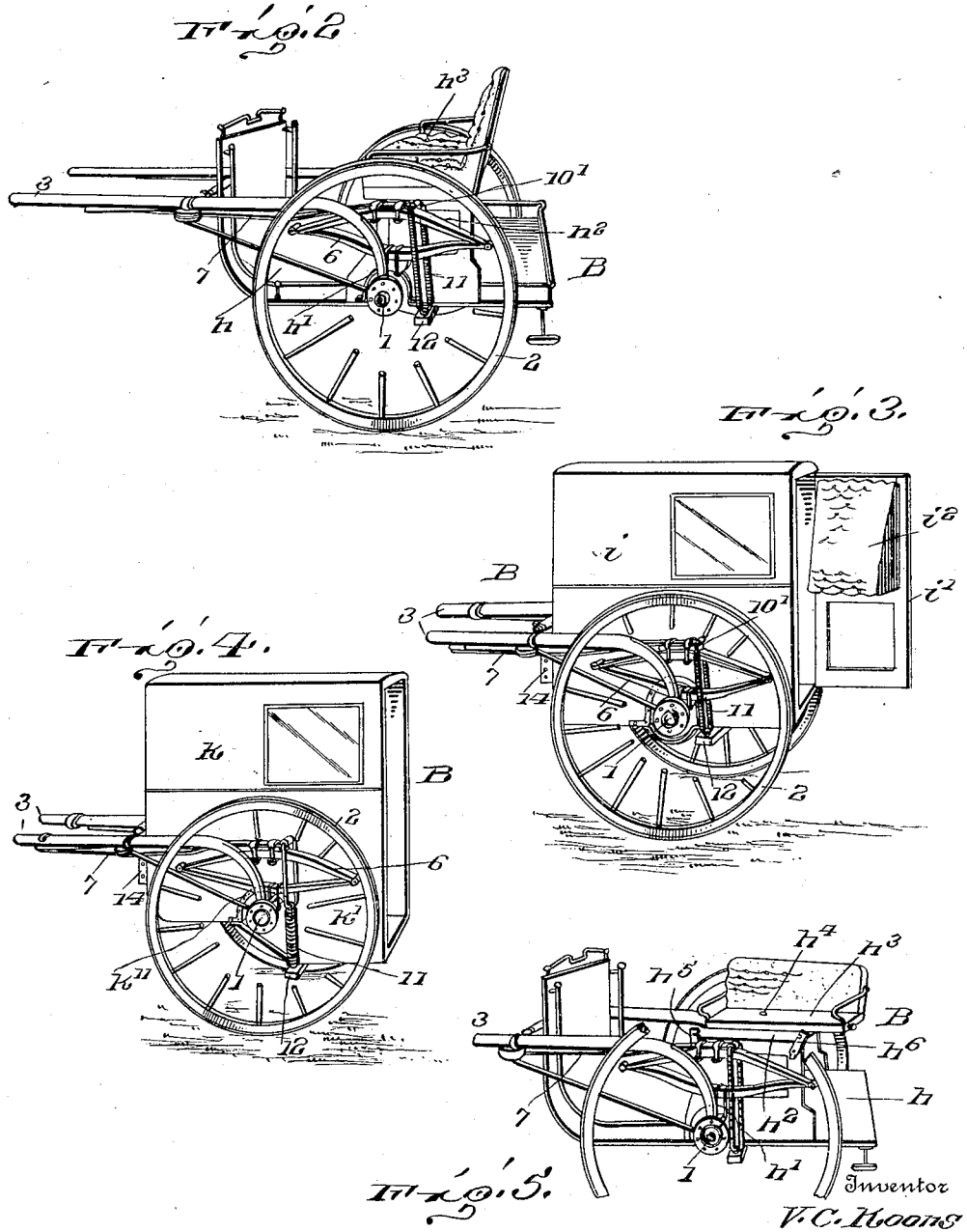

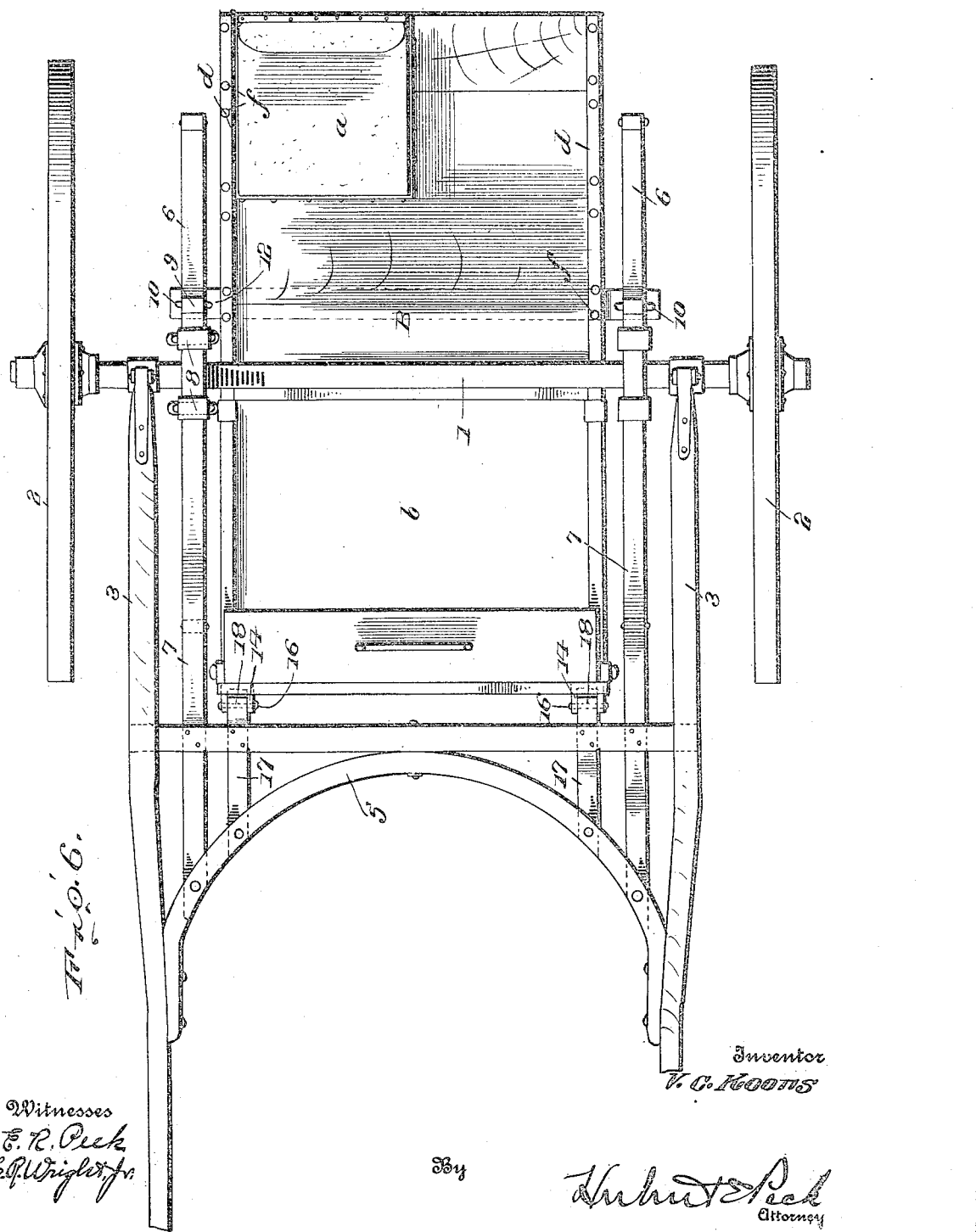

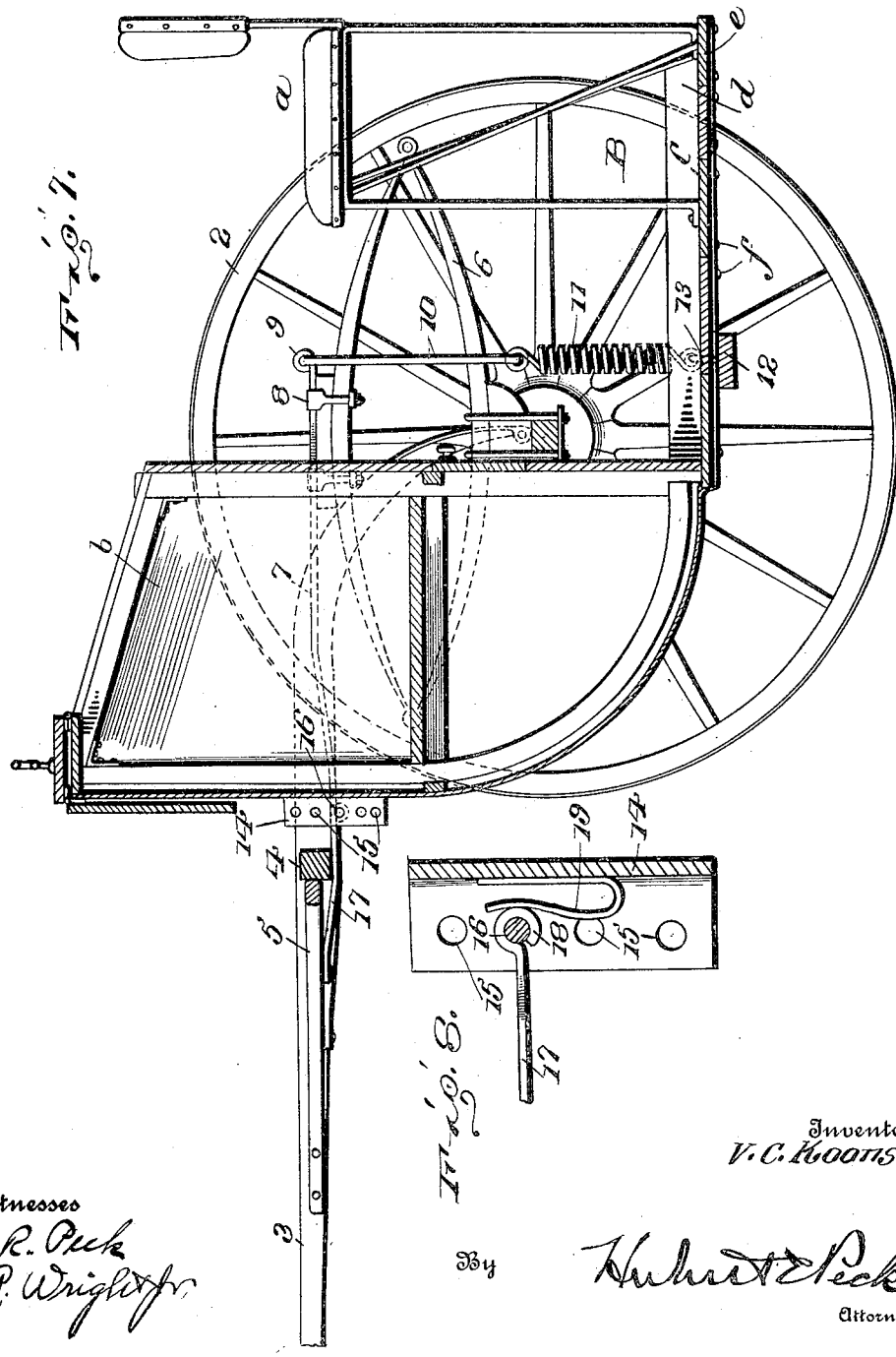

VIRGIL C. KOONS, OF COLORADO SPRINGS, COLORADO.

TWO-WHEELED VEHICLE.

1,126,033.  Specification of Letters Patent.  Patented Jan. 26, 1915.

Application filed November 17, 1911. Serial No. 660,822.

*To all whom it may concern:*

Be it known that I, VIRGIL C. KOONS, a citizen of the United States, residing at Colorado Springs, El Paso county, Colorado, have invented certain new and useful Improvements in Two-Wheeled Vehicles; and I do hereby declare the following to be a full, clear, and exact description of the invention, such as will enable others skilled in the art to which it appertains to make and use the same.

This invention relates to certain improvements in two wheeled vehicles; and the objects and nature of the invention will be readily understood by those skilled in the art in the light of the following description of the accompanying drawings illustrating what I now consider to be my preferred embodiment from among other formations and arrangements within the spirit and scope of my invention.

The invention consists in certain novel features in construction and in combinations and arrangements as more fully and particularly set forth hereinafter.

Referring to the accompanying drawings;—Figure 1, is a perspective of a two-wheeled vehicle embodying my invention, and disclosing one form of load-carrying body. Figs. 2, 3, and 4, are perspective views of two-wheeled vehicles embodying my invention and respectively provided with different kinds or forms of load carrying bodies. Figs. 5, 6, 7, and 8, are views illustrating details of the running gear construction and the manner of coupling the body thereto, and involving features of my invention common to the various vehicles illustrated as well as to forms not illustrated.

In the accompanying drawings, the running gear comprises axle 1, carried by the two wheels 2, and the thills 3, curving downwardly and rearwardly to the axle and coupled to the end portions thereof. At a point in front of the vehicle body the two thills are rigidly secured together by the horizontal rigid cross bar 4, usually traversing the under edges of the straight upper portions of the thills and fixed thereto. The thills and cross bar are braced and strengthened by horizontal brace 5, at its front ends rigidly fixed to the thills respectively, and at its center rigidly fixed to the central portion of the cross bar. This brace is usually termed a "half circle." On the opposite end portions of the axle and adjacent to the inner sides of the thills, I provide a pair of elliptical springs 6. The lower halves of these springs rest on and are suitably clipped or clamped to the axle as will be readily understood by those skilled in the art.

On the opposite sides of the body and between the same and the thills, I provide a pair of approximately horizontally-disposed, longitudinally-arranged vertically-flexible stiff plate springs 7, at their front ends traversing the under edges of the cross bar 4, and half circle 5, and fixedly bolted or otherwise secured thereto, and at their rear ends arranged longitudinally of and above and resting on the central portions of the upper halves of the elliptical springs and fixedly secured thereto, as by pairs of clips or clamps 8. If so desired, the rear ends of these plate springs 7, can be curled to form transverse eyes 9, for the reception or attachment of the connecting eyes or loops 10, or 10′, at the upper ends of depending body sustaining coiled springs 11.

B, indicates generally any suitable load carrying body arranged between the elliptical springs, and extending either over or under the axle but freely vertically movable independently thereof and not being directly mounted thereon.

At a point intermediate its length and in rear of the axle, I provide the body with a rigid bottom cross bar 12, fixedly secured thereto and at its ends projecting beyond the sides thereof preferably to points directly below the elliptical springs and rear ends of the side springs. The bar ends are preferably formed with strong rigid loops 13, or other means for the attachment of the lower end eyes or loops of the vertically disposed body sustaining heavy coiled springs 11.

The front end of the body extends forwardly to a point closely behind the cross bar 4, and is pivotally coupled to the forward portion of the running gear to swing on a horizontal transverse axis, through the medium of suitable coupling mechanism. For instance, I show the front end of the body near its opposite vertical edges provided with clevis-like devices fixedly secured thereto. Each clevis 14, can be in the form of a vertically elongated metal bracket, U-shaped in cross section, and having its vertical parallel forwardly projecting flanges formed with vertical series of alined transverse bolt holes 15, adapted to receive a removable transverse pivot or coupling bolt 16. This bolt can be vertically adjusted to any pair of bolt holes to raise or depress the front end of the body with respect to the front transverse pivot or axis on which it swings.

A pair of parallel longitudinally arranged metal plates or bars 17, traverse the under faces of, and each is rigidly secured to the half circle and cross bar 4. Said bars project rearwardly from the cross bar to enter said brackets or clevises 14, respectively. Each coupling bar 17, is formed at its projecting rear end with a transverse eye 18, to fit between the flanges of a clevis and register with any pair of bolt holes 15, thereof, and removably receive and turn on the pivot bolt 16, of such clevis and thus establish the pivotal coupling between the running gear and vehicle body.

If so desired, any suitable anti-rattling devices 19, can be provided to prevent looseness and rattling of the couplings and pivot bolts in the clevises. The pivotal couplings between the elevated front portion of the body and the front elevated portion of the running gear, might be otherwise arranged than by having the coupling bars enter between vertical flanges of the clevises or brackets to brace and stiffen the body against undue lateral play.

It will be noted that the body is suspended from the side and elliptical springs through the medium of the coiled springs and is upheld solely by the front pivoted couplings in connection with the coiled springs. The coiled springs are arranged to hang as near the vertical position as possible and are confined against excessive lateral play by the upper elongated eyes or loops 10, loosely embracing the elliptical springs, or by arranging the springs in pairs, the springs of each pair being arranged on opposite sides of the elliptical spring and coupled together at their upper ends and to the side spring eye by yoke or loop 10', straddling the top half of the elliptical spring. The weight of the load on the body is carried primarily by the coiled springs yieldingly supported of course by the elliptical springs and the side springs, and as the body yields vertically it swings on the transverse axis coupling its front end to the coupling gear.

Material advantages are attained by providing for the vertical adjustment of the body with respect to the transverse axis of the coupling between the front end of the body and the running gear for the purpose of shifting the leverage of the body on the coiled spring supports thereof. For instance, if a heavy load on the body causes undue downward movement thereof, this can be remedied by elevating the pivot bolts 16, that is, removing them, depressing the front end of the body, and reinserting the bolts in higher bolt holes 15, than those originally occupied by them. When this is done, the body tilts on the cross bar 12, as a fulcrum to elevate the rear end of the body and depress its front end. When thus tilted upwardly and rearwardly the body can move down a greater distance and can carry a greater load, without being depressed to an objectionably low position.

Material advantages are attained by employing the plate or bar side springs rigidly secured at their front ends to the forward portion of the running gear and at their rear ends to the elliptical springs as these springs coöperate with the running gear and elliptical springs in stiffening the vehicle and in increasing the easy riding movement and motion thereof. It will be noted that the rear portions of these springs can be curved or deflected upwardly to generally conform to the curvature of the upper halves of the elliptical springs. Advantages are also attained by suspending the coiled springs from the side springs at the tops of the elliptical springs just in rear of the vertical plane of the longitudinal axis of the axle.

The arrangement, wherein the front end of the body is pivotally coupled to the running gear and the rear portion of the body is carried by the spring-supported depending coiled springs, is such as to overcome and eliminate the objectionable horse motion so common in two wheeled vehicles, and to impart an exceedingly easy and pleasant riding motion to the body when in use.

Various vehicle bodies can be employed in connection with the devices and arrangements hereinbefore described.

In Fig. 1, the body is composed of a depressed platform arranged below the axle and at its rear portion provided with a seat $a$, and at its front end provided with a vertically disposed box $b$, having a top opening adapted to be closed by a sectional vertically swingable cover capable of being swung forwardly over the top of the receptacle with one section hanging at the front thereof, about as disclosed in my prior Patent No. 923,278, June 1, 1909, although in the present improvement the box is rigid with and carried solely by the body, and has a supplemental lower receptacle with a rear opening and door. If so desired, the box which forms part of the body, can have sheet metal walls braced by heavy metal corner pieces and posts and if so desired by internal sills. The platform consists of cross planks $c$, traversing the under edges of top longitudinal sills $d$, and at their bottom faces traversed by metal strips or bars e. The bars e, planks c, and sills d, are rigidly secured together by vertical bolts f. A worn plank can be readily removed by removing the bolts f, passing therefrom and then knocking the planks endwise from between the metal strips e, and the top sills. A new plank can then be inserted endwise and bolted in place. The platform can be extended and curved upwardly and forwardly to form the front end of the body and the front wall of the box and to receive the coupling clevises hereinbefore described. The front wall thus formed can be faced with sheet metal if so desired.

In Figs. 2 and 5, I show a platform $h$, about as described in connection with Fig. 1, without the front box but formed with an upwardly extending transverse arch $h'$, to accommodate the axle. This arch extends up in a seat base $h^2$, formed on the central portion of the body. This base $h^2$, carries a seat $h^3$, and the seat is pivoted at one end—see $h^4$—to swing rearwardly and horizontally to permit entrance into the body from the rear. A stop $h^5$, and a lock $h^6$, can be provided to normally hold the seat in operative position.

In Fig. 3, I show an inclosed covered body $i$ having side and front windows and a rear door $i'$, can be provided with a cushion $i^2$, to form a back support, when the door is closed, for the driver when seated on a stool or seat in the body. In this form the body is also elevated so as to require an arch to pass over the axle and permit the free up and down movement of the body independently thereof. In Fig. 4, I also show an inclosed covered body $k$, having side and front windows and a rear open end. The rear end $k'$, of the platform of the body is depressed to form a low platform on which the driver can stand with head room under the cover. This body is arranged to permit the driver to readily and easily step therefrom and thereinto. In this construction the platform is also provided with an arch $k''$ over the axle.

It is evident that various changes might be resorted to in the forms, constructions and arrangements of the parts described, that parts might be omitted or features added without departing from the spirit and scope of my invention, and hence I do not wish to limit myself to the exact disclosures hereof but consider myself entitled to all such changes as fall within the spirit and scope of the invention.

What I claim is;

1. A two-wheeled vehicle comprising a running gear, a vertically swingable body at its front end hinged to a forward portion of said gear to swing on a transverse axis and in rear of its front end having a bottom cross bar 12 projecting at its ends beyond the body sides, and body-sustaining vertically disposed retractive coiled springs at their lower ends coupled to said projecting ends of the cross bar and at their upper ends coupled to and sustained by the running gear.

2. A two-wheeled vehicle comprising an axle, thills coupled thereto, vertically disposed expansion springs mounted on the axle, longitudinally arranged vertically-flexible plate springs at their rear ends upheld by and coupled to said expansion springs and at their front ends fixed to said thills, retraction coiled springs depending from and sustained by said plate springs and expansion springs, a vertically swingable body coupled to and sustained by said depending coiled springs, and means coupling the forward end of said body to said thills to rock on a transverse axis.

3. A two-wheeled vehicle comprising a running gear having a wheeled axle and a forwardly extending draft frame, a vertically swingable body, depending spring supports therefor applied thereto in rear of the axle, and a hinge connection between the forward end of the body and said draft frame comprising rearwardly extending eyes rigid with the draft frame, vertically arranged clevises rigid with the front end of the body and having vertical series of transverse bolt holes, and removable pivot pins adapted to said eyes and holes and forming the transverse axis on which the body is vertically rockable.

4. A two-wheeled vehicle comprising a wheeled axle, thills coupled thereto, longitudinally arranged plates fixed to said thills and having transverse eyes at their rearwardly projecting ends, a body at its forward end having vertically arranged clevises to receive said eyes, and vertically adjustable pivot bolts to couple together the eyes and clevises and form a transverse axis on which the body is rockable, and spring devices yieldingly upholding the body.

5. A two-wheeled vehicle comprising a wheeled axle, thills coupled thereto, cross means rigidly securing the thills together, longitudinal bars secured to said cross means, a vertically swingable body, means hinging the front end of said body to the rear ends of said longitudinal bars, and depending body supporting springs arranged in rear of the axle.

6. A two wheeled vehicle comprising a wheeled axle, thills coupled thereto, side springs mounted on the axle, plate springs fixed thereto and extending forwardly therefrom and at their front ends fixed to said thills, a body freely movable independently of said axle, pivotal vertically-adjustable coupling means between said body and said thills, and depending body-sustaining coiled springs.

7. A two-wheeled vehicle comprising a wheeled axle, thills extending forwardly therefrom, elliptical springs mounted on the axle, vertically-flexible side connections from the elliptical springs to forward portions of the thills, a vertically disposed body, vertically disposed coiled body-sustaining springs at their lower ends coupled to the lower rear portion of the body, and sustaining loops applied to the upper ends of said coiled springs and straddling said elliptical springs to maintain the coiled springs against lateral deflection.

8. A two-wheeled vehicle comprising a wheeled axle, forwardly extending thills, vertically disposed expansion springs mounted on the axle, longitudinal plate springs at their rear ends fixed to and sustained by said expansion springs and at their front ends fixedly coupled with said thills, a vertically swingable body at its forward end pivotally coupled with said thills, and vertically disposed body-sustaining coiled springs at their upper ends hung from the rear ends of said plate springs and at their lower ends coupled to said body in rear of the axle.

9. A two-wheeled vehicle comprising a running gear, a vertically swingable body, means hinging the front end of the body to an elevated forward portion of the running gear comprising a transverse axis vertically adjustable with respect to the body to raise and lower the front of the body, and spring supports for the body applied thereto in the rear of the forward ends and hung from the running gear.

10. A two-wheeled vehicle comprising a wheeled axle, thills coupled thereto, upright springs fixed to and rising from said axle, longitudinal plate springs at their rear ends secured to and upheld by said upright springs and at their front ends secured to said thills, retractive coiled springs hung from and supported by said upright and longitudinal springs and depending therefrom, a vertically swingable body attached to the lower ends of said coiled springs and upheld thereby, and means hinging the front end of said body by a vertically-adjustable transverse axis to said elevated front portions of the thills.

11. A two-wheeled vehicle comprising a wheeled axle, side springs fixed thereon and rising therefrom, thills coupled to said axle, longitudinally-arranged vertically-flexible plate springs at their rear ends coupled on and upheld by said side springs and at their front ends fixed to said thills in advance of the vehicle body, a body freely movable vertically independently of said axle and at its free end pivotally joined to said thills to rock on a transverse axis, and depending coiled springs supported by said plate and side springs and at their lower ends connected to said body to uphold the same.

In testimony whereof I affix my signature. in presence of two witnesses.

VIRGIL C. KOONS.

Witnesses:
JOHN MOFFETT,
J. H. CASWELL.

Copies of this patent may be obtained for five cents each, by addressing the "Commissioner of Patents, Washington, D. C."